United States Patent
Tanaka et al.

[11] Patent Number: 5,947,365
[45] Date of Patent: Sep. 7, 1999

[54] PROCESS FOR PRODUCING FLAT HEAT EXCHANGE TUBES

[75] Inventors: Daishi Tanaka; Masakazu Furuta; Kazuyuki Takahashi; Yasuhiro Osame, all of Oyama, Japan

[73] Assignee: Showa Aluminum Corporation, Osaka, Japan

[21] Appl. No.: 08/882,338

[22] Filed: Jun. 25, 1997

[30] Foreign Application Priority Data

Jun. 26, 1996 [JP] Japan .................................. 8-166165
Jun. 26, 1996 [JP] Japan .................................. 8-166166

[51] Int. Cl.$^6$ .......................... B23K 31/00; B23K 31/02
[52] U.S. Cl. ......................... 228/136; 228/183; 228/265
[58] Field of Search ................................. 228/183, 173.2, 228/265, 136, 205, 208, 254, 173.4, 137; 165/177; 29/890.053, 890.049

[56] References Cited

U.S. PATENT DOCUMENTS 5,163,602 11/1992 Usui ........................ 228/143

FOREIGN PATENT DOCUMENTS 0 457 470 A1 11/1991 European Pat. Off. .
0 617 250 A2 9/1994 European Pat. Off. .

OTHER PUBLICATIONS

Metals Handbook Ninth Edition, vol. 6, p. 1025, 1983.
European Patent Office Communication for European Patent Application No. 97110163.9 dated Oct. 15, 1997, along with European Search Report.
European Patent Office Patent Abstracts of Japan Appl. No. 0108657 Jul. 4, 1989, Pub No. 02290668 Nov. 30, 1998.
European Patent Office Patent Abstracts of Japan Appl. No. 63144266 Oct. 6, 1988 Pub. No. 0208452 Mar. 26, 1990.

*Primary Examiner*—Patrick Ryan
*Assistant Examiner*—Kiley Stoner
*Attorney, Agent, or Firm*—Armstrong, Westerman, Hattori, McLeland & Naughton

[57] ABSTRACT

A process for producing a flat heat exchange tube having opposed upper and lower walls and a plurality of reinforcing walls connected by brazing between the respective upper and lower walls for dividing the tube interior into parallel fluid passages. In order to strengthen the brazed connection between the reinforcing walls and the lower surface of the upper wall and to prevent the creation of a clearance space therebetween, the lower surface of the upper wall is provided in advance with longitudinally extending ridges with which the upper surfaces of the reinforcing walls come in contact to eliminate the clearances and thus insure the existence of a continuous brazed connection between each reinforcing wall and lower surface of the upper wall.

3 Claims, 11 Drawing Sheets

PROCESS FOR PRODUCING FLAT HEAT EXCHANGE TUBES

BACKGROUND OF THE INVENTION

The present invention relates to a process for producing flat heat exchange tubes, more particularly to flat heat exchange tubes for condensers, evaporators and like heat exchangers for use in car coolers.

JP-B No. 45300/91 discloses a condenser for use in car coolers which comprises a pair of headers arranged at right and left in parallel and spaced apart from each other, parallel flat heat exchange tubes each joined at its opposite ends to the two headers, corrugated fins arranged in an air flow clearance between adjacent heat exchange tubes and brazed to the adjacent tubes, an inlet pipe connected to the upper end of the left header, an outlet pipe connected to the lower end of the right header, a left partition provided inside the left header and positioned above the midportion thereof, and a right partition provided inside the right header and positioned below the midportion thereof, the number of heat exchange tubes between the inlet pipe and the left partition, the number of heat exchange tubes between the left partition and the right partition and the number of heat exchange tubes between the right partition and the outlet pipe decreasing from above downward. A refrigerant flowing into the inlet pipe in a vapor phase flows zigzag through the condenser before flowing out from the outlet pipe in a liquid phase. Condensers of the construction described are called parallel flow or multiflow condensers, realize high efficiencies, lower pressure losses and supercompactness and are in wide use in recent years in place of conventional serpentine condensers.

It is required that the heat exchange tube for use in the condenser have pressure resistance since the refrigerant is introduced thereinto in the form of a gas of high pressure. To meet this requirement and to achieve a high heat exchange efficiency, the heat exchange tube is made of a hollow aluminum extrudate which comprises flat upper and lower walls, and a reinforcing wall connected between the upper and lower walls and extending longitudinally. To improve the heat exchange efficiency and to compact the condenser, it is desired that the flat heat exchange tube have a small wall thickness and the lowest possible height. In the case of extrudates, however, the extrusion technique imposes limitations on the reduction in the height of the tube and in the wall thickness.

To overcome this problem, a process is known, as disclosed in JP-A No. 281373/97, for producing a flat heat exchange tube having parallel fluid passages in its interior and comprising upper and lower walls, right and left side walls interconnecting the right and left side edges of the upper and lower walls and a plurality of reinforcing walls connected between the upper and lower walls, extending longitudinally of the tube and spaced apart from one another, by brazing a first tube component member of aluminum and a second tube component member of aluminum into an integral assembly, the first component member including a lower wall forming portion and a plurality of reinforcing wall forming portions integral with and extending upward from the lower wall forming portion, the second component member including an upper wall forming portion comprising a brazing sheet having a brazing material layer over the lower surface thereof for interconnecting opposite side wall forming portions of the first component member.

Figure 20:
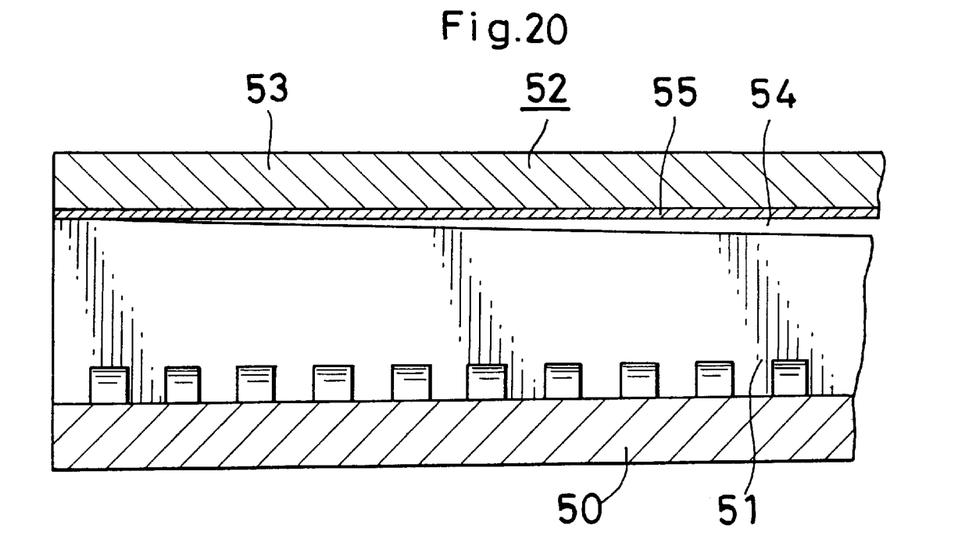
FIG. 20 is an enlarged fragmentary view in longitudinal section showing a first component member and a second component member as tacked together by a conventional process.

However, it is likely that the upper edge of the reinforcing wall forming portion 51 of the first component member 50 will not be horizontal but will be inclined, for example, from one end toward the other end as shown in FIG. 20 since the first component member is prepared by rolling an aluminum sheet with upper and lower rolling rolls one of which has annular grooves. When the first component member 50 and the second component member 52 are assembled, therefore, the lower surface of the upper wall forming portion 53 of the second component member 52 is in contact with the upper edge of the reinforcing wall forming portion 51 of the first component member 50 only at one end portion of the assembly, with a small clearance 54 created at the other portion. This gives rise to the following problem. When melted for brazing, the brazing material in the form of the brazing material layer 55 over the lower surface of the upper wall forming portion 53 collects to the portion where the lower surface of the upper wall forming portion 53 is in contact with the upper edge of the reinforcing wall forming portion 51 and subsequently flows into the clearance 54 to progressively fill the clearance. Nevertheless, the molten brazing material is not very smoothly flowable due to the influence of an oxide film present over the surface of the brazing material layer 55, consequently failing to completely fill up the clearance 54 and to form a fillet over the entire length of the reinforcing wall forming portion 51.

Figure 21:
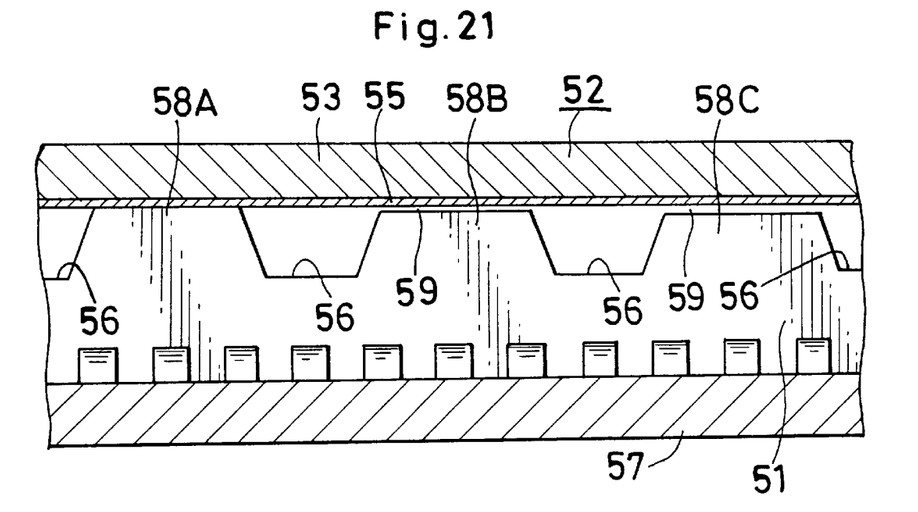
FIG. 21 is an enlarged fragmentary view in longitudinal section showing a first component member having cutouts in reinforcing walls and the second component member as tacked together by the conventional process.

FIG. 21 shows a case wherein each of reinforcing wall forming portions 51 has a plurality of cutouts 56 formed in its upper edge and arranged at a spacing longitudinally thereof, and the openings of the cutouts 56 are closed with an upper wall forming portion 53 when a first component member 57 and a second component member 52 are brazed to form communication holes for causing parallel refrigerant passages to communicate with one another. Especially in this case, it is likely that the upper edges of the parts 58A, 58B, 58C of the reinforcing wall forming portion 51 of the first component 57 between the adjacent cutouts 56 in the porion 51 will not always be positioned at the same level but will be at different levels. It therefore follows that the upper edge of only one part 58A is in contact with the upper wall forming portion 53 of the second component member 52, with a small clearance 59 formed between the upper wall forming portion 53 and the upper edges of the other parts 58B, 58C. When the two component members are brazed, the upper edges of the reinforcing wall forming portions 51 of the first component member 57 remain unbrazed to the upper wall forming portion 53 of the second component member 52 at the locations where the clearance 59 exits. The brazing operation consequently fails to give sufficient strength to the joints between the upper wall forming portion 53 of the second component member 52 and the reinforcing wall forming portions 51 of the first component member 57, and the flat heat exchange tube produced is unable to fulfill the pressure resistance requirement.

It appears useful to give an increased thickness to the brazing material layer over the lower surface of the second component member in order to solve the problem, but the brazing material then drips during brazing to reduce the cross sectional area of the fluid passages to result in increased resistance to the flow of the fluid, possibly clogging up the fluid passage. In the case where the reinforcing wall forming portions have cutouts, there is the likelihood of the brazing material closing communication holes.

An object of the present invention is to provide a process for producing flat heat exchange tubes free of the foregoing problems relating to brazing and having satisfactory pressure resistance.

SUMMARY OF THE INVENTION

The present invention provides a process for producing a flat heat exchange tube having parallel fluid passages in its interior and comprising an upper wall, a lower wall, right and left side walls interconnecting right and left side edges of the upper and lower walls and a plurality of reinforcing walls connected between the upper and lower walls, extending longitudinally of the tube and spaced apart from one another, by brazing a first tube component member of aluminum and a second tube component member of aluminum into an integral assembly, the first component member including a lower wall forming portion and a plurality of reinforcing wall forming portions integral with and extending upward from the lower wall forming portion, the second component member including an upper wall forming portion comprising a brazing sheet having a brazing material layer over at least the lower of upper and lower surfaces thereof, the process comprising forming in advance at least one longitudinally extending ridge for giving enhanced brazing strength on a part of the lower surface of the upper wall forming portion of the second component member which part corresponds to each of the reinforcing wall forming portions, tacking the two component members together with a force applied thereto from above and below, and thereafter brazing the two component members. Accordingly, even if a clearance is locally created between the lower surface of the upper wall forming portion of the second component member and the upper edge of the reinforcing wall forming portion of the first component member, the clearance forming portion of the reinforcing wall forming portion comes into contact with the ridge on the lower surface of the upper wall forming portion and is brazed to the ridge if the clearance is equal to or smaller than the height of projection of the ridge. The flat heat exchanger obtained can therefore be free from faulty brazing joints in its entirety.

Preferably, the part corresponding to each reinforcing wall forming portion is formed with a pair of ridges for giving enhanced brazing strength, and the upper-end corners of each reinforcing wall forming portion and a lower end of each of the ridges have a circular-arc cross section, each of the ridges being so positioned that an obliquely lateral portion of the lower end of the ridge comes into contact with the corner of the reinforcing wall forming portion when the two component members are tacked together. When the two component members are tacked together with a force acting thereon from above and below, the upper end of each reinforcing wall forming portion is pressed against the pair of ridges, forcing the ridges away from each other, and/or the upper-end corners of the same portion deform, with the result that the reinforcing wall forming portion is brought into contact with the ridges over increased areas to result in improved brazing.

The ridges are preferably about 10 to about 200 micrometers in the height of projection. When the reinforcing wall forming portion has cutouts formed in its upper edge, the parts of the upper edge between the adjacent cutouts are likely to be positioned at different levels, consequently creating a clearance between the lower surface of the upper wall forming portion of the second component member and the upper edge of the reinforcing wall forming portion. If the height is smaller than 10 micrometers, it becomes likely that the upper edge of the reinforcing wall forming portion of the first component will not come into contact with the ridges when the two component members are tacked together since the clearance is not smaller than 10 micrometers. If the height is greater than 200 micrometers, there is a likelihood that the two component members can not be tacked together.

Preferably, a heat transfer area increasing ridge is formed in advance on a part of the lower surface of the upper wall forming portion of the second component member which part is other than the part corresponding to the reinforcing wall forming portion, whereby the heat exchanger tube is given an improved heat exchange efficiency.

The present invention further provides a process for producing a flat heat exchange tube having parallel fluid passages in its interior and comprising an upper wall, a lower wall, right and left side walls interconnecting right and left side edges of the upper and lower walls and a plurality of reinforcing walls connected between the upper and lower walls, extending longitudinally of the tube and spaced apart from one another, by brazing a first tube component member of aluminum and a second tube component member of aluminum into an integral assembly, the first component member including a lower wall forming portion and a plurality of reinforcing wall forming portions integral with and extending upward from the lower wall forming portion, the second component member including an upper wall forming portion comprising a brazing sheet having a brazing material layer over at least the lower of upper and lower surfaces thereof, the process comprising roughing the lower surface of the upper wall forming portion of the second component member to mar an oxide film produced over the surface in advance, tacking the two component members together, and thereafter brazing the two component members. With this process, the brazing material is allowed to flow more smoothly for brazing. It is likely that the upper edge of the reinforcing wall forming portion will not be horizontal but will be inclined, for example, from one end toward the other end, such that when the two component members are assembled, the upper wall forming portion of the second component member is in contact with the upper edge of the reinforcing wall forming portion of the first component member only at one end portion of the assembly, with a small clearance created at the other portion. Even in such a case, the brazing material, when melted, collects first to the location where the upper wall forming portion is in contact with the reinforcing wall forming portion and subsequently flows into the clearance to progressively fill up the entire clearance. As a result, a fillet is formed over the entire length of the reinforcing wall forming portion between this portion and the upper wall forming portion.

Preferably, each of the reinforcing wall forming portions is formed in an upper edge thereof with a plurality of cutouts arranged longitudinally thereof at a spacing, and communication holes for causing the parallel fluid passages to communicate with one another are formed in the reinforcing walls by brazing the two component members and thereby closing openings of the cutouts with the upper wall forming portion. This results in an improved heat exchange efficiency.

The communication holes in the reinforcing walls permit the refrigerant flowing through the parallel fluid passages to flow also widthwise of the flat heat exchange tube, whereby portions of the refrigerant are so mixed together as to eliminate refrigerant temperature differences between the passages. The opening ratio which is the percentage of all the communication holes in each reinforcing wall to the wall is preferably 10 to 40%. When in this range, the opening ratio assures satisfactory thermal conductance, assuring the heat exchange tube of a greatly improved heat exchange efficiency. If the ratio is less than 10%, the thermal conductance does not increase, whereas even when the ratio exceeds 40%, the conductance n6 longer increases but only an increased coefficient of friction will result. The opening ratio within the range of 10 to 40% is more preferably 10 to 30%, most preferably about 20%. The communication holes formed in the reinforcing walls are preferably in a staggered arrangement when seen from above.

Preferably, the first component member has upright walls upstanding from and integral with respective right and left side edges of the lower wall forming portion and having the same height as the reinforcing walls, the right and left side edges each having an outwardly upward slope providing a lower surface thereof, and the second component member has depending walls depending from and integral with respective right and left side edges of the upper wall forming portion, the depending walls having a depending length greater than the height of the upright walls and to be lapped over the respective upright walls on the outer side thereof, so that when the first component member and the second component member are tacked together, lower ends of the depending walls are bent and lapped over the respective outwardly upward slopes and made flush with the lower wall forming portion. This eliminates the need for jigs or the like for tacking the two component members. Moreover, with the flat heat exchange tube thus produced, the right and left side walls are of double-wall construction and therefore given improved pressure resistance.

The pitch of the reinforcing walls in the widthwise direction of the tube is preferably up to 4 mm. A lower heat exchange efficiency will result if the pitch is in excess of 4 mm. The height of the reinforcing walls is preferably up to 2 mm. If the wall height is over 2 mm, not only difficulty is encountered in fabricating a compacted heat exchanger, but the resistance to the passage of air also increases to result in an impaired heat exchange efficiency.

The present invention will be described in greater detail with reference to the accompanying drawings.

DESCRIPTION OF THE PREFERRED EMBODIMENTS

Embodiments of the present invention will be described below with reference to the drawings. The term "aluminum" as used in the following description includes pure aluminum and aluminum alloys. Throughout the drawings, like parts are designated by like reference numerals and will not be described repeatedly.

Figure 22:
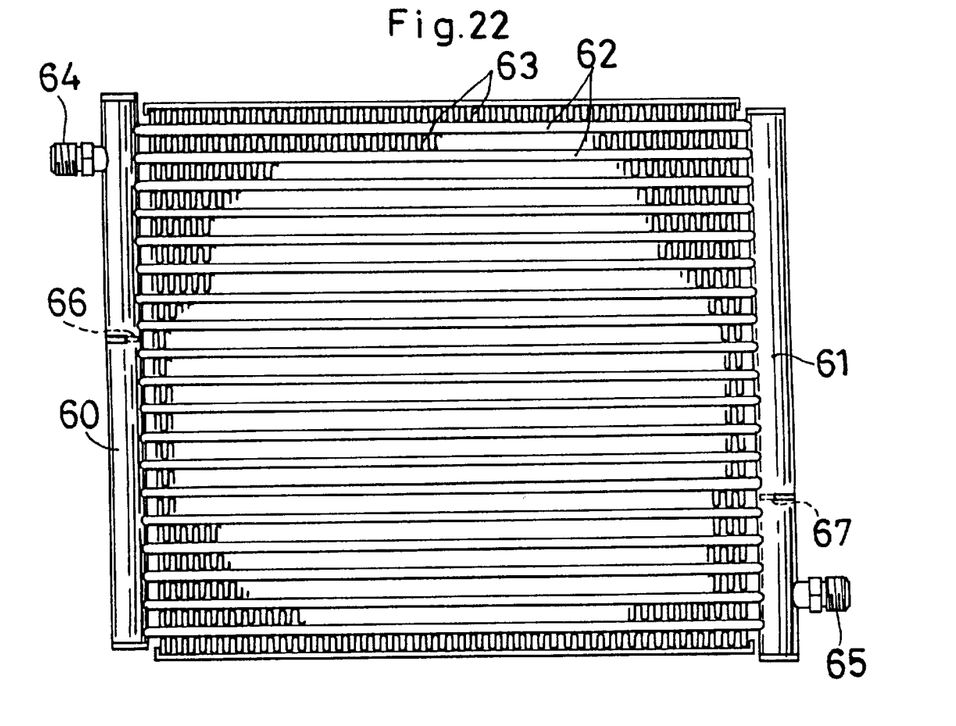
FIG. 22 is a front view showing a condenser comprising flat heat exchange tubes produced by the process of the invention.

FIG. 22 shows a condenser comprising flat heat exchange tubes produced by a process of the invention. The condenser comprises a pair of headers 60, 61 arranged at left and right in parallel and spaced apart from each other, parallel flat heat exchange tubes 62 each joined at its opposite ends to the two headers 60, 61, corrugated fins 63 arranged in an air flow clearance between adjacent heat exchange tubes 62 and brazed to the adjacent tubes 62, an inlet pipe 64 connected to the upper end of the left header 60, an outlet pipe 65 connected to the lower end of the right header 61, a left partition 66 provided inside the left header 60 and positioned above the midportion thereof, and a right partition 67 provided inside the right header 61 and positioned below the midportion thereof, the number of heat exchange tubes 62 between the inlet pipe 64 and the left partition 66, the number of heat exchange tubes 62 between the left partition 66 and the right partition 67 and the number of heat exchange tubes 62 between the right partition 67 and the outlet pipe 65 decreasing from above downward. A refrigerant flowing into the inlet pipe 65 in a vapor phase flows zigzag through the condenser before flowing out from the outlet pipe 65 in a liquid phase.

Embodiment 1

Figure 1:
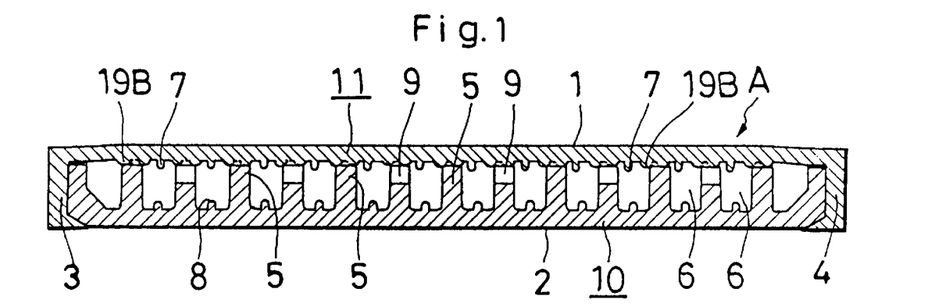
FIG. 1 is a cross sectional view of a flat heat exchange tube produced by the process according to Embodiment 1 of the invention.
Figure 2:
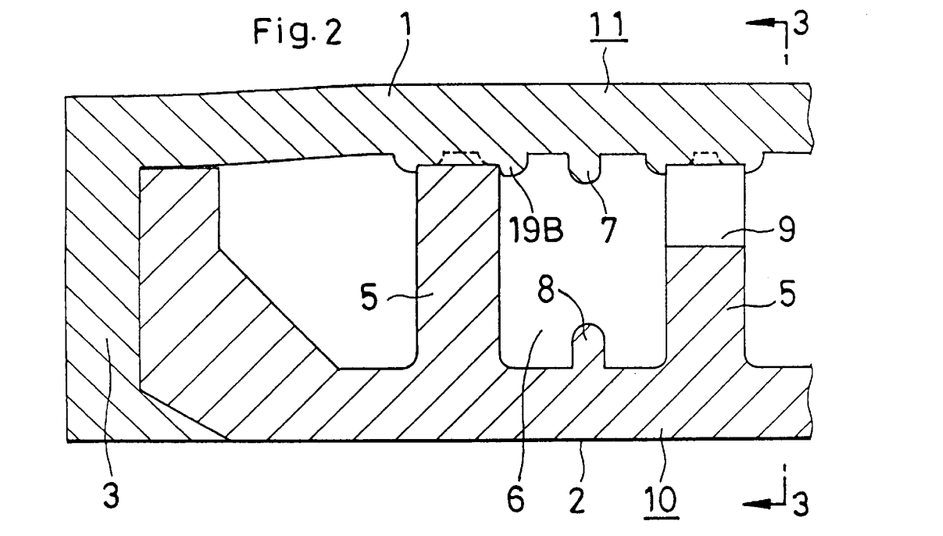
FIG. 2 is an enlarged fragmentary view in cross section of the flat heat exchanger tube of FIG. 1.
Figure 3:
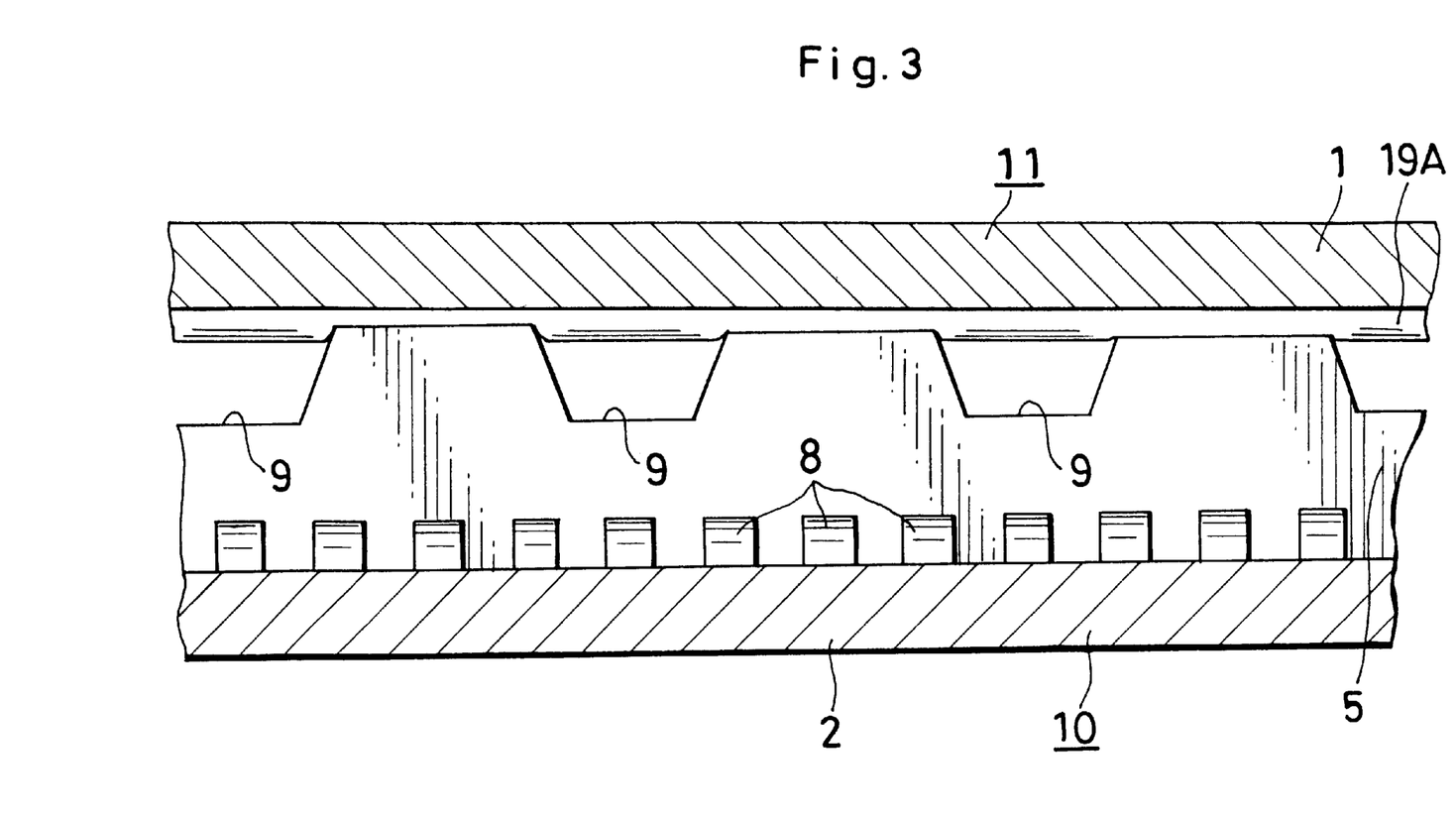
FIG. 3 is an enlarged view in section taken along the line 3—3 in FIG. 2.

This embodiment is shown in FIGS. 1 to 8. The process of this embodiment produces a flat heat exchange tube A, which as shown in FIGS. 1 to 3, comprises flat upper and lower walls 1, 2 to which fins are to be brazed, vertical left and right side walls 3, 4 connected between opposite side edges of the walls 1, 2, and a plurality of reinforcing walls 5 arranged between the side walls 3, 4, connected between the upper and lower walls 1, 2, extending longitudinally of the tube A and spaced apart from one another by a predetermined distance. The tube A has parallel refrigerant passages 6 in its interior. Between each two adjacent reinforcing walls 5, a heat transfer area increasing ridge 7 extending in the longitudinal direction is formed on the lower surface of the upper wall 1, and a multiplicity of heat transfer area increasing projections 8 arranged at a predetermined spacing in the longitudinal direction are formed on the upper surface of the lower wall 2. The reinforcing walls 5 are formed in their upper ends with a plurality of trapezoidal communication holes 9 which are in a staggered arrangement when seen from above for effecting communication between the parallel refrigerant passages 6. The flat heat exchange tube A comprises a first tube component member 10 of aluminum and a second tube component member 11 of aluminum.

Figure 4:
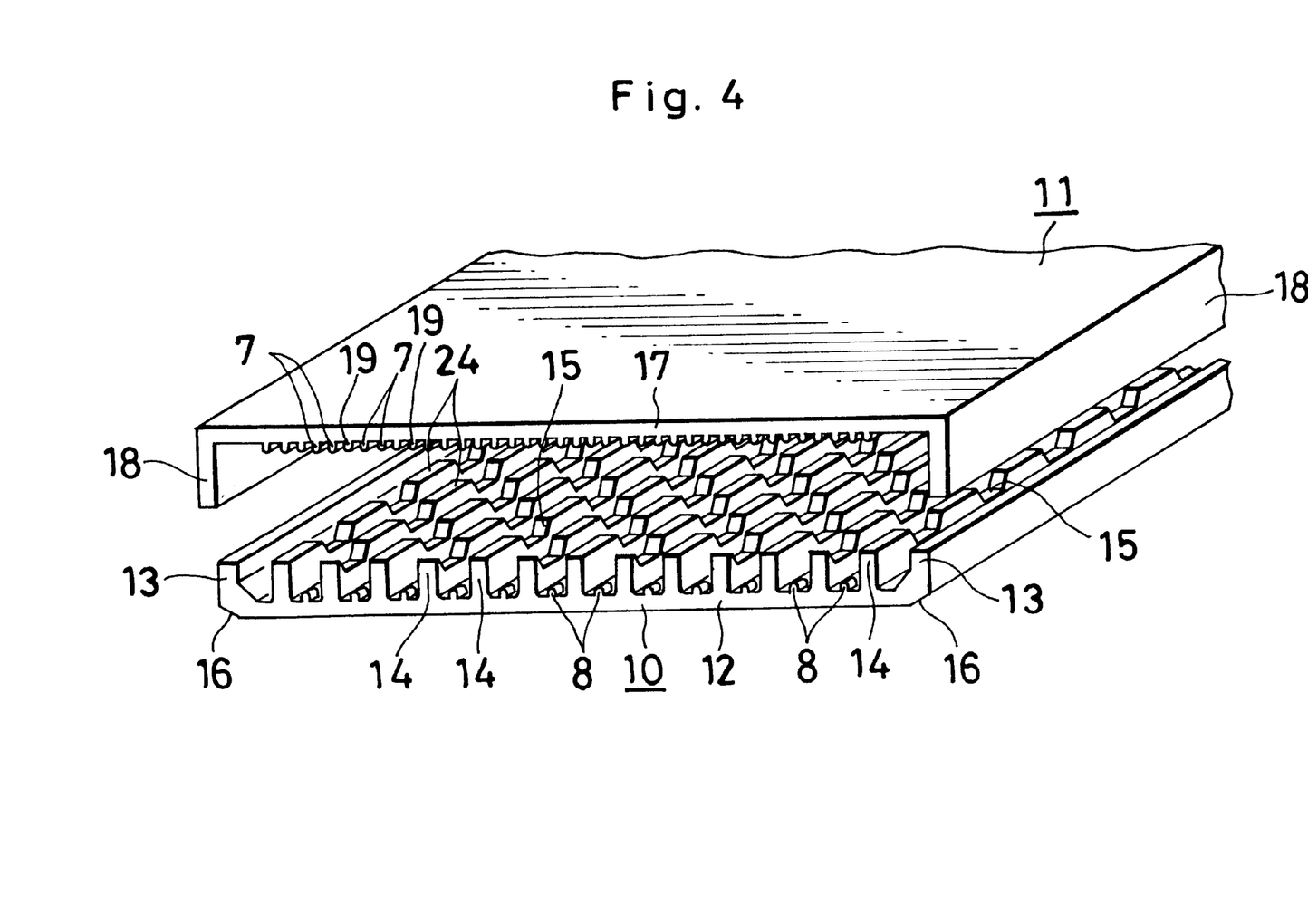
FIG. 4 is a fragmentary perspective view showing how to combine a first tube component member and a second tube component member by the process of Embodiment 1.

The flat heat exchange tube A is produced in the following manner. The first component member 10 is prepared from a brazing sheet having a brazing material layer over its lower surface, and the second component member 11 from a brazing sheet having a brazing material layer over each of its upper and lower surfaces, by rolling each of the brazing sheets to a shape having a specified cross section as seen in FIG. 4 using upper and lower rolling rolls, one of which has a predetermined longitudinal section. The first component member 10 comprises a flat lower wall forming portion 12, upright walls 13 integral with and upstanding from the lower wall forming portion 12 at its respective opposite side edges, a plurality of reinforcing wall forming portions 14 between the opposite upright walls 13, and heat transfer area increasing projections 8 between the adjacent reinforcing wall forming portions 14. Each reinforcing wall forming portion 14 has in its upper end trapezoidal cutouts 15 providing communication holes 9. An outward slope 16 is formed at the bottom of each side edge of the lower wall forming portion 12. The upright walls 13 and the reinforcing wall forming portions 14 are equal in height. The second component member 11 comprises a flat upper wall forming portion 17, depending walls 18 integral with and extending downward from the upper wall forming portion 17 at its respective opposite side edges, brazing strength enhancing ridges 19 formed in pairs each positioned at the portion corresponding to the reinforcing wall forming portion, and heat transfer area increasing ridges 7 formed at portions other than the portions corresponding to the respective reinforcing wall forming portions. The depending walls 18 have a depending length slightly greater than the height of the upright walls 13. The upper wall forming portion 17 has a greater width than the lower wall forming portion 12 so as to permit the depending walls 18 to be lapped over the respective upright walls 13 from outside. The brazing strength enhancing ridges 19 and the heat transfer area increasing ridges 7 are circular-arc in the cross section of their lower ends and are thus shaped identically.

Figure 5:
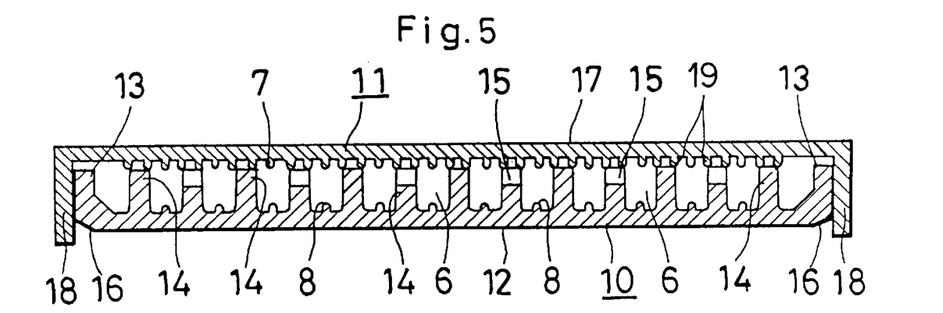
FIG. 5 is a view in cross section showing the first and second component members of FIG. 4 as combined.

The two component members 10, 11 are then degreased, a brazing flux is thereafter applied to these members, and the second component member 11 is subsequently fitted over the first component member 10 as seen in FIG. 5.

Figure 6:
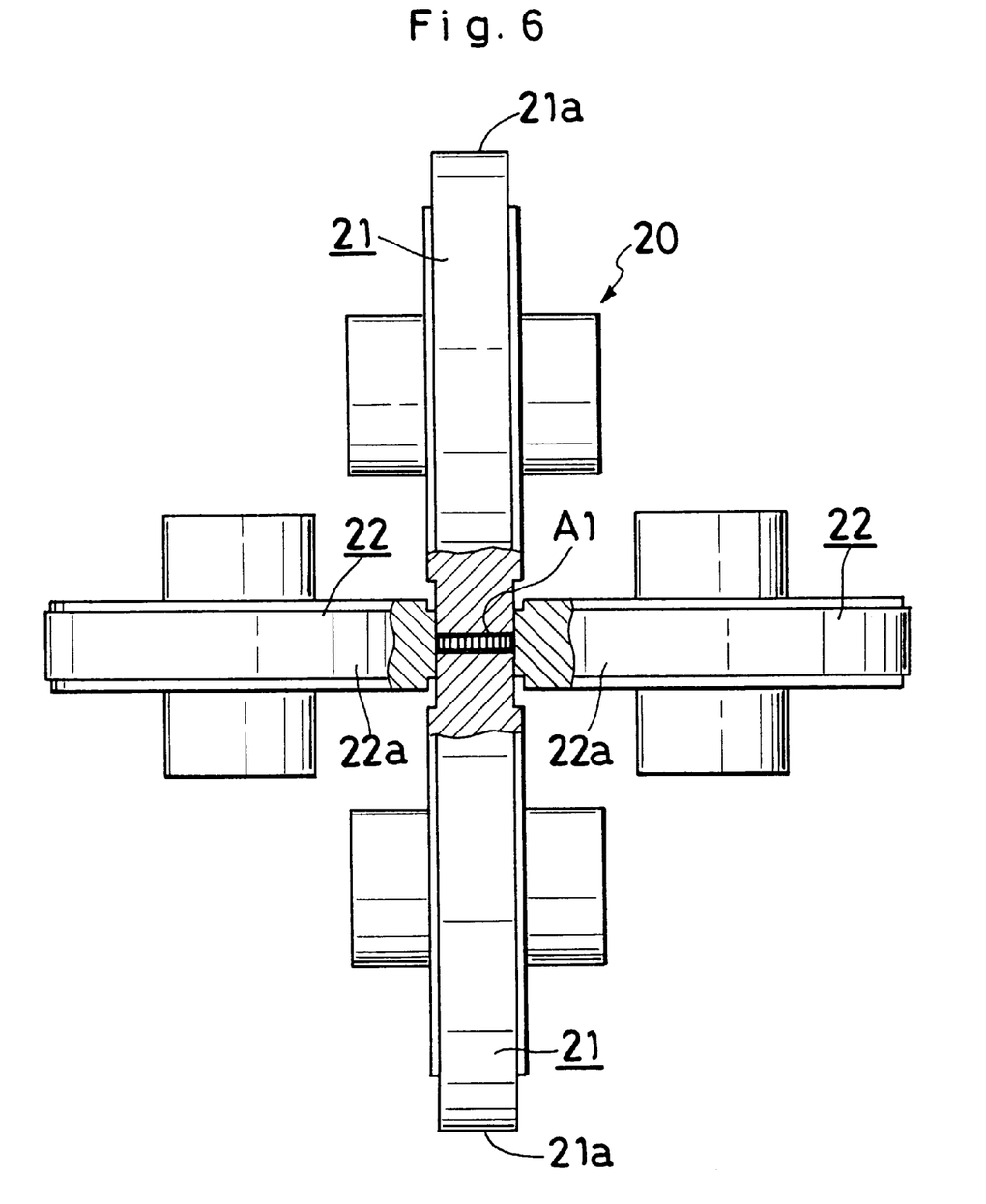
FIG. 6 is a front view partly broken away and showing a tacking device in its entirety.
Figure 7:
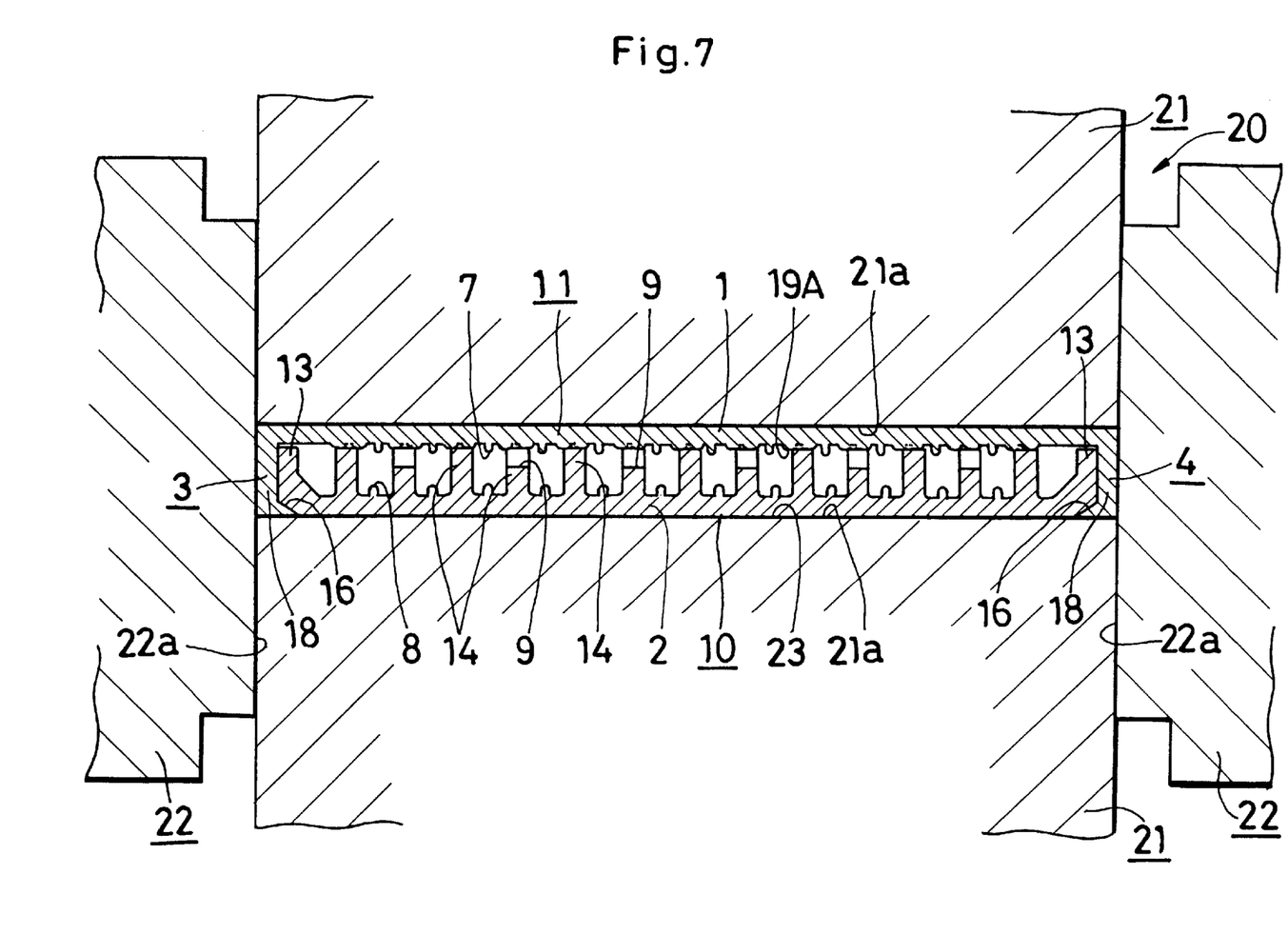
FIG. 7 is an enlarged fragmentary view in section of the tacking device of FIG. 6 to show in detail how to tack the assembly of first and second component members of FIG. 5.

The resulting assembly A1 of the two component members 10, 11 is passed through a tacking device 20 for temporary joining as seen in FIGS. 6 and 7. Prior to this step, one end of the assembly A1 is slightly collapsed to a reduced cross sectional area so that the assembly A1 can be passed through the tacking device 20. The tacking device 20 comprises a pair of upper and lower press rolls 21 and a pair of right and left restraining rolls 22 for preventing widthwise stretching. The pair of press rolls 21 are arranged as vertically spaced apart and are each rotatable about a lateral axis. The pair of restraining rolls 22 are arranged side by side as spaced apart and are each rotatable about a vertical axis. The axes of rotation of the rolls 21, 22 are positioned in the same vertical plane. The press rolls 21 have a peripheral surface 21a of a length equal to the width of the flat heat exchange tube A. The vertical spacing between the upper and lower press rolls 21 is equal to the thickness of the flat heat exchange tube A. The restraining rolls 22 have a peripheral surface 22a of a length greater than the spacing between the upper and lower press rolls 21. The upper and lower portions of peripheral surface 22a of each roll 22 are nearly in contact with the end faces of the upper and lower press rolls 21 which faces are opposed to the roll 22. The lateral spacing between the restraining rolls 22 is equal to the width of the heat exchange tube A. The peripheral surfaces of the upper and lower press rolls 21 and the peripheral surfaces of the right and left restraining rolls 22 define a space 23 having a width equal to the width of the heat exchange tube A and a height equal to the thickness of the tube A.

The assembly A1 is passed through the space 23 defined by the pair of press rolls 21 and the pair of restraining rolls 22, whereby the lower ends of the depending walls 18 of the second component member 11 are bent toward, and into intimate contact with, the outwardly upward slopes 16 of the lower wall forming portion 12 of the first component member 10, and the overall assembly A1 is finished to a flat rectangular shape in cross section. Thus, the first component member 10 and the second component member 11 are tacked together, that is, temporarily joined. It is likely that the parts 24 (see FIG. 4) of the reinforcing wall forming portions 14 between the adjacent cutouts 15 will differ in level, creating a clearance between the part 24 and the lower surface of the upper wall forming portion 17 of the second component member 11. In spite of the clearance, however, the upper edge of the part 24 is brought into intimate contact with brazing strength enhancing ridges 19 on the lower surface of the upper wall forming portion 17 by the above operation. When the clearance is smaller than the height of projection of the ridge 19, the ridge 19 deforms into a ridge 19A (see FIG. 8).

Figure 8:
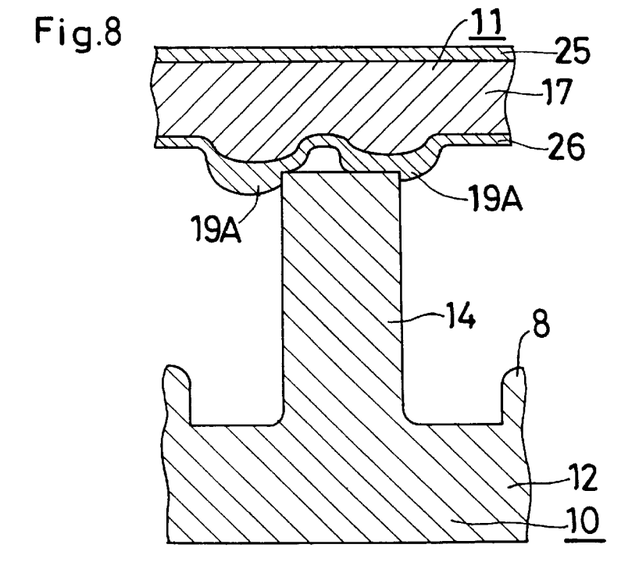
FIG. 8 is an enlarged fragmentary sectional view showing in detail the two component members as tacked together by the device of FIG. 6.

Next, the tacked component members 10, 11 are heated to a brazing temperature, whereby the upper edges of the upright walls 13 of the first component member 10 are brazed to opposite side edges of the lower surface of the upper wall forming portion 17 of the second component member 11, and the upper end of each reinforcing wall forming portion 14 of the first component member 10 is brazed to two ridges 19. The second component member 11 is prepared by rolling a brazing sheet having brazing material layers 25, 26 over the respective upper and lower surfaces thereof, and has downwardly projecting ridges 19 as seen in FIG. 8, so that the brazing material layer has a greater thickness over the ridges 19 than at the other portions. Accordingly, the brazing material melted for brazing is readily drawn to the ridge portions to fill the clearance between the upper face of the reinforcing wall forming portion 14 and the two ridges 19, consequently forming a deformed ridge 19B on brazing (see FIGS. 1 and 2). Furthermore, the depending walls 18 of the second component member 11 are brazed to the outer side of the upright walls 13 of the first component member 10, and the bent lower ends of the depending walls 18 of the second component member 11 are brazed to the respective slopes 16 of the first component member 10 by a lap joint. In this way, the flat heat exchange tube A is produced.

According to the embodiment described, each of the reinforcing wall forming portions 14 has a plurality of cutouts 15 formed in its upper edge and arranged at a spacing in the longitudinal direction, and communication holes 9 permitting the parallel refrigerant passages 6 to communicate with one another are formed in the reinforcing walls 5 of the heat exchanger A by brazing the two component members 10, 11 to close the openings of the cutouts 15 with the upper wall forming portion 17. However, the reinforcing walls 5 may have no communication holes 5. With no cutouts 15 formed in each reinforcing wall forming portion 14 in this case, the upper edge of the reinforcing wall forming portion 14 is intimately contacted over the entire length thereof with two brazing strength enhancing ridges 19 on the lower surface of the upper wall forming portion 17 when the components members 10, 11 are tacked together.

Figure 9:
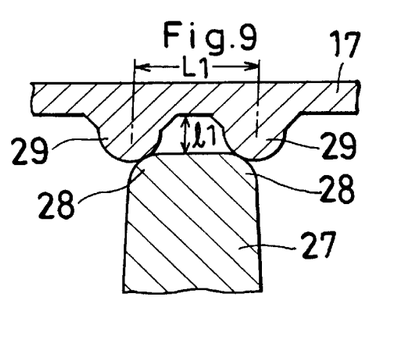
FIG. 9 is an enlarged fragmentary sectional view showing an example of first component member and second component member in combination wherein a pair of brazing strength enhancing ridges on an upper wall forming portion of the second component member are formed in a specific arrangement on the part of the portion corresponding to each of reinforcing wall forming portions.
Figure 10:
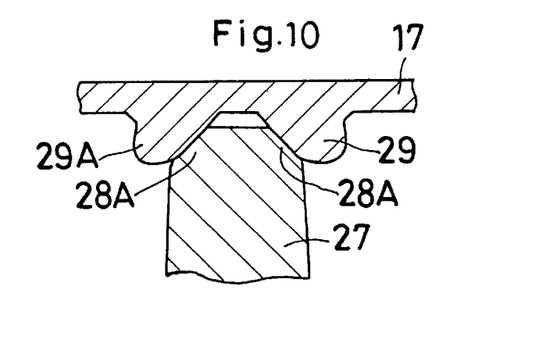
FIG. 10 is an enlarged sectional view showing the assembly of FIG. 9 as tacked together.
Figure 11:
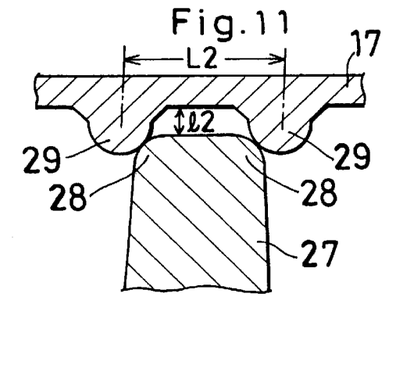
FIG. 11 is an enlarged fragmentary sectional view showing another example of first component member and second component member in combination wherein a pair of brazing strength enhancing ridges on an upper wall forming portion of the second component member are formed in a specific arrangement on the part of the portion corresponding to each of reinforcing wall forming portions.
Figure 12:
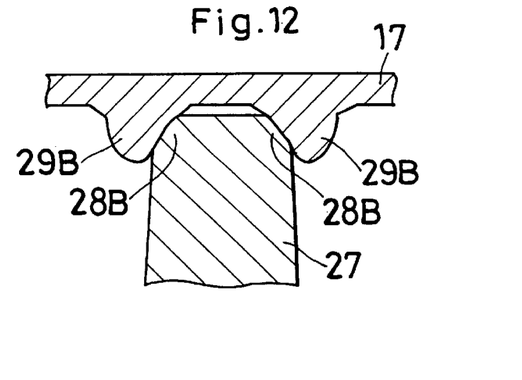
FIG. 12 is an enlarged sectional view showing the assembly of FIG. 11 as tacked together.

With the embodiment described above, two brazing strength enhancing ridges 19 are present at the portion cooperating with each reinforcing wall forming portion, whereas as least one ridge 19 may be formed at this portion. However, FIGS. 9 and 11 show preferred modifications wherein a pair of ridges 29 are present at the portion corresponding to each reinforcing wall forming portion 27, and the upper-end opposite corners 28 of the portion 27 and the lower end of each ridge 29 have a circular-arc cross section, each of the ridges 29 being so positioned that an obliquely lateral portion of its lower end comes into contact with the corner of the reinforcing wall forming portion when the two component members 10, 11 are tacked together. The spacing L2 between the pair of ridges 29 in FIG. 11 is slightly greater than the spacing L1 between the pair of ridges 29 in FIG. 9, with the result that when the two component members 10, 11 are fitted into an assembly, the distance 12 between the upper edge of the reinforcing wall forming portion 27 and the upper wall forming portion 17 in the former modification is smaller than the corresponding distance 11 in the latter modification. When the component members 10, 11 are subjected to pressure from above and below for tacking, the distance 11 (12) is reduced, and the ridges 29 and the upper-end corners 28 of the reinforcing wall forming portion 27 are deformed in either of the modifications, whereas the two modifications are different in the mode of deformation since the distances 11 and 12 are different. The ridges 29 and the upper-end corners 28 of the reinforcing wall forming portion 27 in FIG. 9 are deformed respectively to ridges 29A and to upper-end corners 28A as shown in FIG. 10. The ridges 29 and the upper-end corners 28 of the reinforcing wall forming portion 27 in FIG. 11 are deformed respectively to ridges 29B and to upper-end corners 28B as shown in FIG. 12. Thus, the areas of contact between the pair of deformed ridges 29B and the deformed corners 28B are greater than those between the deformed ridges 29A and the deformed corners 28A.

Embodiment 2

Figure 13:
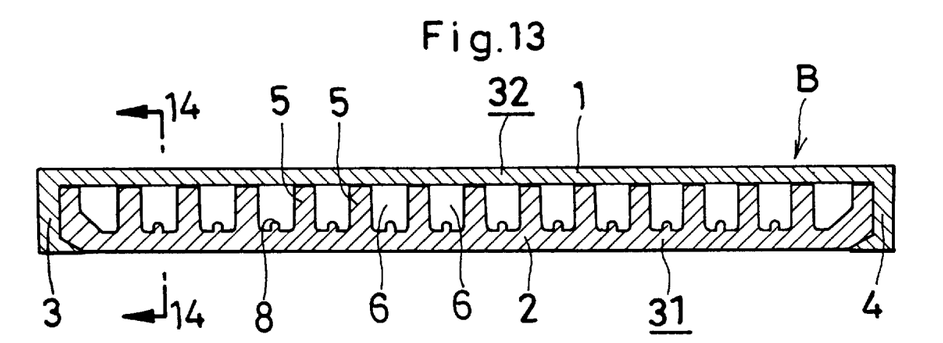
FIG. 13 is a cross sectional view of a flat heat exchange tube produced by the process according to Embodiment 2 of the invention.
Figure 14:
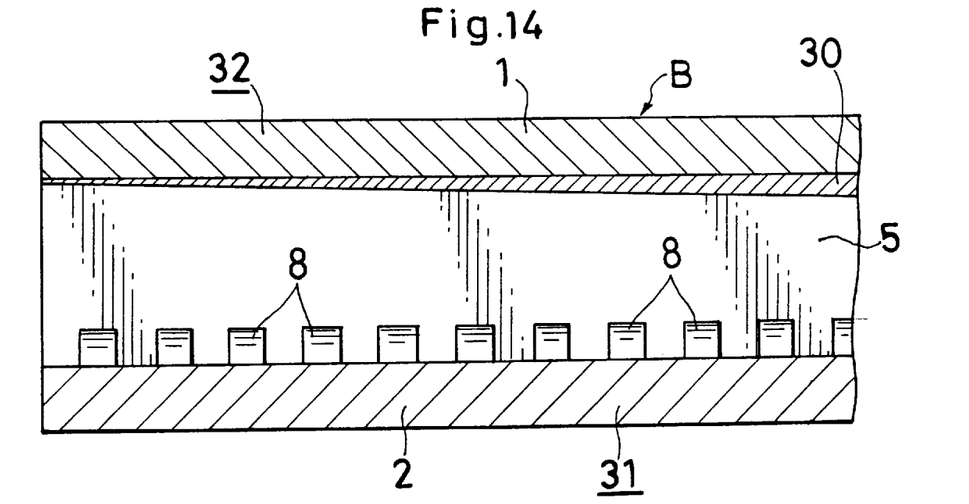
FIG. 14 is an enlarged view in section taken along the line 14—14 in FIG. 13.
Figure 15:
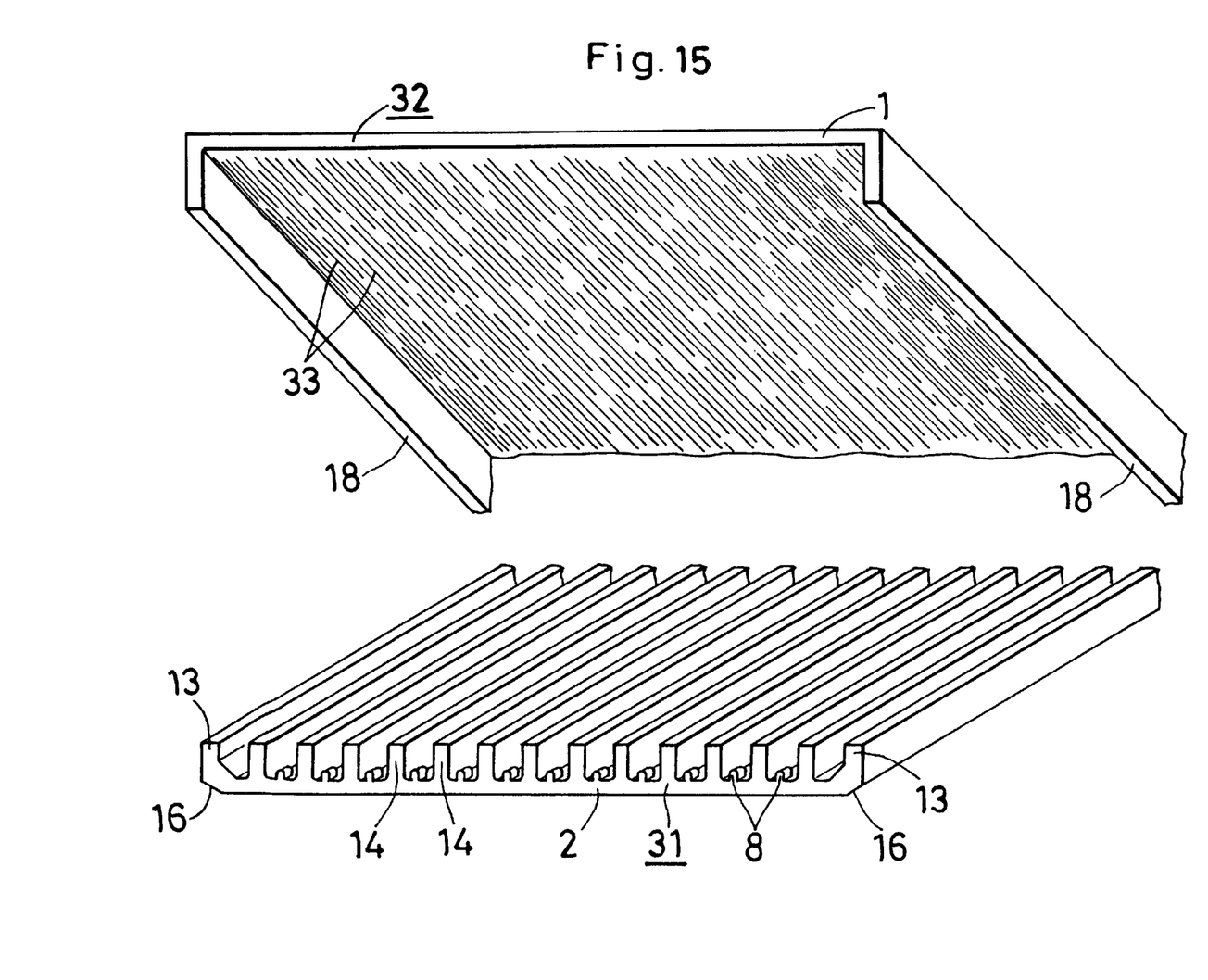
FIG. 15 is a fragmentary perspective view showing how to combine a first tube component member and a second tube component member by the process of Embodiment 2.

This embodiment is shown in FIGS. 13 to 15. The process of this embodiment produces a flat heat exchange tube B, which has the same construction as the heat exchange tube A provided by Embodiment 1 except that as shown in FIGS. 13 and 14, the tube B has none of the communications holes 9, deformed ridges 19B and heat transfer area increasing ridges 7 of the tube A but instead has a fillet 30 filling up a clearance created between the reinforcing wall 5 and the upper wall 1.

The flat heat exchange tube B is prepared from a first tube component member 31 of aluminum and a second tube component member 32 of aluminum which are the same as the respective two component members 10, 11 used in Embodiment 1 except the following differences. The first component member 31 is not formed with the cutouts 15 in the reinforcing wall forming portions 14 of the member 10. The second component member 32 has none of the ridges 19, 7 provided on the lower surface of the upper wall forming portion 17 of the member 11. As shown in FIG. 15, the entire lower surface of upper wall forming portion 17 of the second component member 32 is roughed as by a wire brush prior to assembling to mar an oxide film produced over the surface, as indicated at 33.

The first component member 31 and the second component member 32 are tacked together and then brazed as in Embodiment 1 to obtain the tube B. When the two component members 31, 32 are assembled according to Embodiment 2, it is likely that the upper edge of the reinforcing wall forming portion 14 will not be horizontal but will be inclined, for example, from one end toward the other end, permitting the lower surface of upper wall forming portion 17 of the second component member 32 to be in contact with the upper edge of the reinforcing wall forming portion 14 of the first component member 31 only at one end portion of the assembly, with a small clearance created at the other portion. In such a case, the absence of the oxide film from the portions of mars 33 in the lower surface of the upper wall forming portion 17 allows the brazing material to flow smoothly when melted. The molten brazing material collects first to the location where the upper wall forming portion 17 is in contact with the reinforcing wall forming portion 14 and subsequently flows into and fills up the clearance. As a result, a fillet 30 is formed over the entire length of the reinforcing wall forming portion 14 between this portion and the upper wall forming portion 17.

With the present embodiment, the brazing strength enhancing ridges 19 and the heat transfer area increasing ridges 7 in Embodiment 1 are absent from the lower surface of upper wall forming portion 17 of the second component member 32, whereas the member 32 may be formed with these ridges. In this case, the entire lower surface of the portion 17 including these ridges is roughed to produce mars 33 in the oxide film on the surface.

Figure 16:
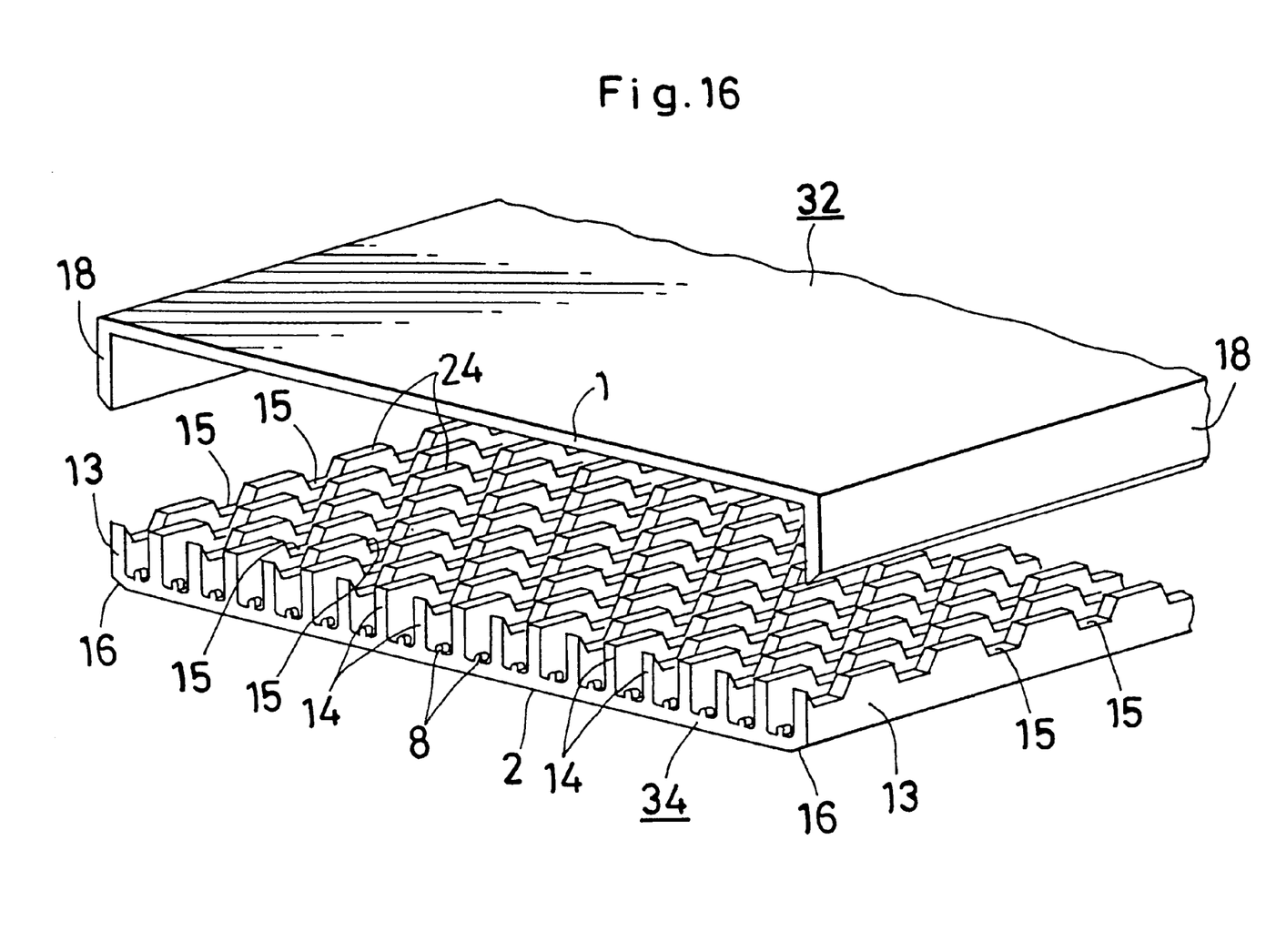
FIG. 16 is a fragmentary perspective view showing how to combine a first component member and the second component member by the process of Embodiment 2, the first component member having cutouts similar to those used in Embodiment 1 and formed in upright walls and reinforcing wall forming portions.

In the process of Embodiment 2, the second component member 32 may be used in combination with a first tube component member 34 having upright walls 13 and reinforcing wall forming portions 14 which are formed with cutouts 15 like those of Embodiment 1 as shown in FIG. 16.

Figure 17:
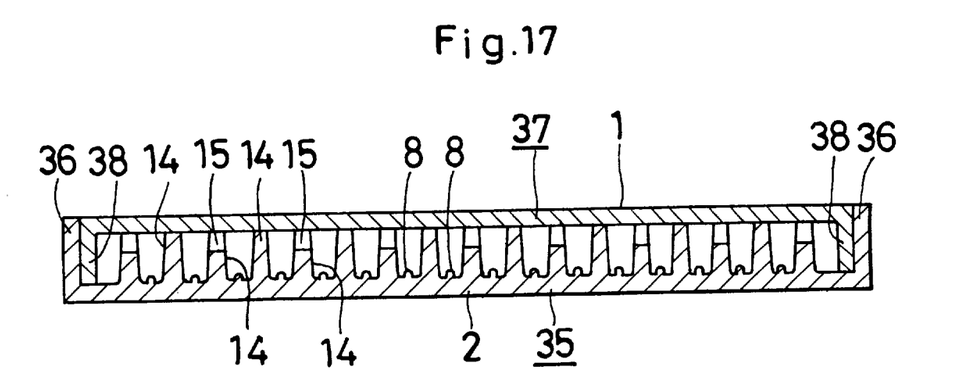
FIG. 17 is a cross sectional view showing a first component member having different upright walls and a second component member having different depending walls, as combined by the process of Embodiment 2.

For use in the process of Embodiment 2, FIG. 17 shows a first tube component member 35 having reinforcing wall forming portions 14 formed with cutouts 15 similar to those formed in Embodiment 1, and upright walls 36 adapted to lap over depending walls 38 of a second tube component member 37 on the outer side thereof. When the two members are tacked together, the upper edges of the upright walls 36 become flush with the upper surface of the upper wall forming portion 17. The first component member 35 has a lower wall forming portion 2, the right and left side edges of which has no outwardly upward slope on the bottom side thereof. The flat heat exchange tube has right and left side walls each in the form of a double wall provided by the upright wall 36 and the depending wall 38.

Figure 18:
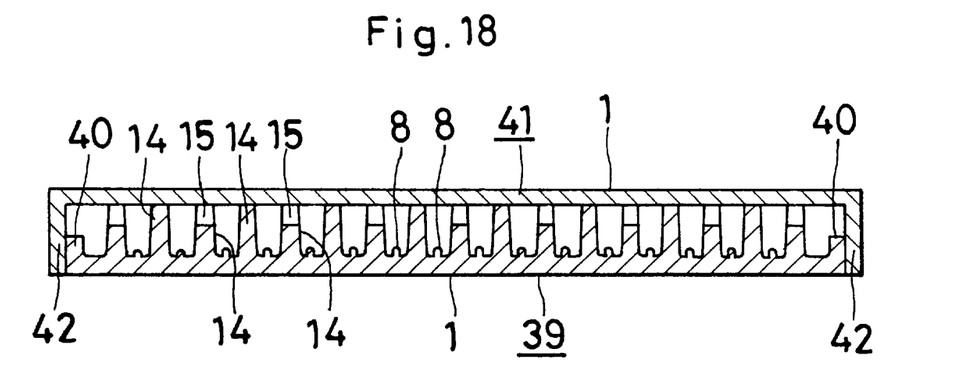
FIG. 18 is a cross sectional view showing a first component member having different upright walls and a second component member having different depending walls, as combined by the process of Embodiment 2.

FIG. 18 shows a first tube component member 39 having upright walls 40 which are smaller than reinforcing walls 14 in height, and a second tube component 41 having depending walls 42 adapted to lap over the respective upright walls 40 on the outer side thereof, such that when the two members are tacked together, the lower edges of the depending walls 42 become flush with a flat lower wall forming portion 2 of the first component member 39. The opposite side walls of the flat heat exchange tube obtained are each in the form of a double wall only at the lower half thereof.

Figure 19:
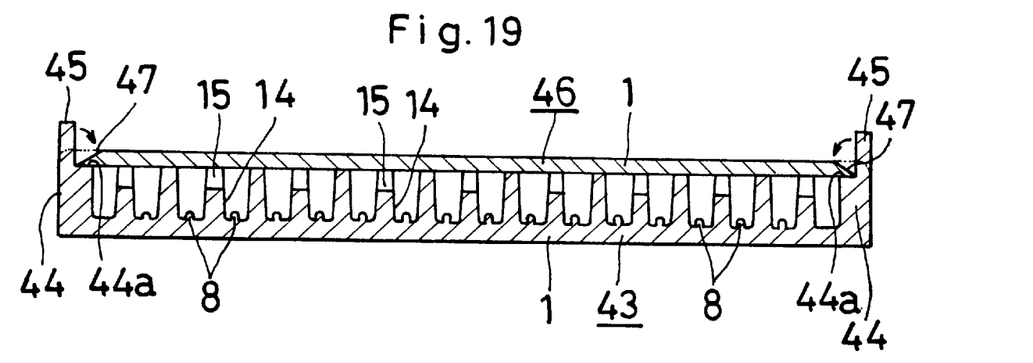
FIG. 19 a cross sectional view showing a first component member having still different upright walls and a second component member having no depending walls, as combined by the process of Embodiment 2.

FIG. 19 shows a first tube component 43 including upright walls 44 which have approximately twice the thickness of reinforcing wall forming portions 14 and which are each formed with a stepped portion 44a at the same level as the upper edge of the reinforcing wall forming portion 14 and an upward thin projection 45 extending from the stepped portion. A second tube component member 46 has an upper surface providing an outwardly downward slope 47 at each of its right and left side edges. The upward projection 45 is bent and lapped over the slope 47 when the two component members 43, 46 are tacked together.

What is claimed is:

1. A process for producing a flat heat exchange tube having parallel fluid passages in its interior and including an upper wall, a lower wall, right and left side walls interconnecting right and left side edges of the upper and lower walls and a plurality of reinforcing walls connected between the upper and lower walls, extending longitudinally of the tube and spaced apart from one another, by brazing a first tube component member of aluminum and a second tube component member of aluminum into an integral assembly, the first tube component member including a lower wall forming portion and a plurality of reinforcing wall forming portions integral with and extending upward from the lower wall forming portion throughout substantially a full height of the fluid passage defined by said reinforcing wall, the second tube component member including an upper wall forming portion comprising a brazing sheet having a brazing material layer over at least the lower of upper and lower surfaces thereof, the process comprising the steps of:

forming in advance on said lower surface of the upper wall forming portion of the second tube component member at least one longitudinally extending ridge overlying an upper end of each respective reinforcing wall for giving enhanced brazing strength to the lower surface of the upper wall forming portion of the second tube component member upon engagement with said reinforcing wall, tacking the two tube component members together with a force applied thereto from above and below, and thereafter brazing the two tube component members.

2. A process for producing a flat heat exchange tube as defined in claim 1 wherein the part of said upper end of said upper wall forming portion of said second tube component member overlying each reinforcing wall forming portion is formed with a pair of ridges for giving enhanced brazing strength, and the upper-end-corners of each reinforcing wall forming portion and a lower end of each of the ridges have a circular-arc cross section, each of the ridges being so positioned that an obliquely lateral portion of the lower end of the ridge comes into contact with the corner of the reinforcing wall forming portion when the two tube component members are tacked together.

3. A process for producing a flat heat exchange tube as defined in claim 1 wherein a heat transfer area increasing ridge is formed in advance on a part of the lower surface of the upper wall forming portion of the second tube component member which part is other than the part overlying the reinforcing wall forming portion.

\* \* \* \* \*